United States Patent
Xie et al.

(10) Patent No.: US 11,367,456 B2
(45) Date of Patent: Jun. 21, 2022

(54) STREAMING VOICE CONVERSION METHOD AND APPARATUS AND COMPUTER READABLE STORAGE MEDIUM USING THE SAME

(71) Applicant: UBTECH ROBOTICS CORP LTD, Shenzhen (CN)

(72) Inventors: Jiebin Xie, Shenzhen (CN); Ruotong Wang, Shenzhen (CN); Dongyan Huang, Shenzhen (CN); Zhichao Tang, Shenzhen (CN); Yang Liu, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 1 day.

(21) Appl. No.: 17/110,323

(22) Filed: Dec. 3, 2020

(65) Prior Publication Data
US 2021/0201925 A1    Jul. 1, 2021

Related U.S. Application Data

(63) Continuation of application No. PCT/CN2019/129978, filed on Dec. 30, 2019.

(51) Int. Cl.
*G10L 21/013* (2013.01)
*G10L 13/033* (2013.01)
(Continued)

(52) U.S. Cl.
CPC .......... *G10L 21/013* (2013.01); *G10L 13/033* (2013.01); *G10L 15/02* (2013.01);
(Continued)

(58) Field of Classification Search
CPC ...... G10L 15/063; G10L 15/16; G10L 21/003
See application file for complete search history.

(56) References Cited

U.S. PATENT DOCUMENTS 10,706,867 B1 * 7/2020 Villavicencio ........ G10L 21/003
10,777,186 B1 * 9/2020 Stefani .................... G10L 15/04
(Continued)

FOREIGN PATENT DOCUMENTS

CN          109147809 A       1/2019

OTHER PUBLICATIONS

ISR for PCT/CN2019/129978.
Written opinions of ISA for PCT/CN2019/129978.

*Primary Examiner* — Shaun Roberts

(57) ABSTRACT

The present disclosure provides a streaming voice conversion method as well as an apparatus and a computer readable storage medium using the same. The method includes: obtaining to-be-converted voice data; partitioning the to-be-converted voice data in an order of data obtaining time as a plurality of to-be-converted partition voices, where the to-be-converted partition voice data carries a partition mark; performing a voice conversion on each of the to-be-converted partition voices to obtain a converted partition voice, where the converted partition voice carries a partition mark; performing a partition restoration on each of the converted partition voices to obtain a restored partition voice, where the restored partition voice carries a partition mark; and outputting each of the restored partition voices according to the partition mark carried by the restored partition voice. In this manner, the response time is shortened, and the conversion speed is improved.

20 Claims, 10 Drawing Sheets

(51) Int. Cl.
*G10L 15/02* (2006.01)
*G10L 15/04* (2013.01)
*G10L 25/03* (2013.01)
*G10L 25/69* (2013.01)

(52) U.S. Cl.
CPC .............. *G10L 15/04* (2013.01); *G10L 25/03* (2013.01); *G10L 25/69* (2013.01); *G10L 2021/0135* (2013.01)

(56) References Cited

U.S. PATENT DOCUMENTS

2007/0156843 A1* 7/2007 Sagen .................... G10L 15/26
709/217
2012/0253794 A1* 10/2012 Chun .................... G10L 21/003
704/201
2018/0342258 A1* 11/2018 Huffman ................ G10L 15/02

* cited by examiner

Curve diagram of the weight of the converted tail common voice of the previous partition Curve diagram of the weight of the converted head common voice of the next partition

STREAMING VOICE CONVERSION METHOD AND APPARATUS AND COMPUTER READABLE STORAGE MEDIUM USING THE SAME

CROSS REFERENCE TO RELATED APPLICATIONS

The present disclosure is a continuation-application of International Application PCT/CN2019/129978, with an international filing date of Dec. 30, 2019, the contents of all of which are hereby incorporated by reference.

BACKGROUND

1. Technical Field

The present disclosure relates to voice processing technology, and particularly to a streaming voice conversion method as well as an apparatus and a computer readable storage medium using the same.

2. Description of Related Art

Voice conversion has been widely used at the civilian level. This technology is mainly used to convert the sound of one creature into the sound of another creature. It has been used in scenes such as voice changers, movies, news, and speech synthesis. In the conversion process, premised on ensuring the quality of the converted voice, the conversion speed is also important for the user.

At present, the industry of voice processing technology has a qualitative requirement for the speed of voice conversion, that is, the processes from the input to the output of the voice should be real-time. In other words, the conversion performance is capable of processing one second of voice per second. However, the existing voice conversion system still need to wait for the user to finish speaking before one voice conversion process can be carried out. That is, the existing voice conversion system is not for long-time voice input, hence it is difficult to achieve real-time conversion and maintain fidelity. Therefore, it is particularly necessary to develop a voice conversion method with improved conversion speed while maintaining fidelity.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
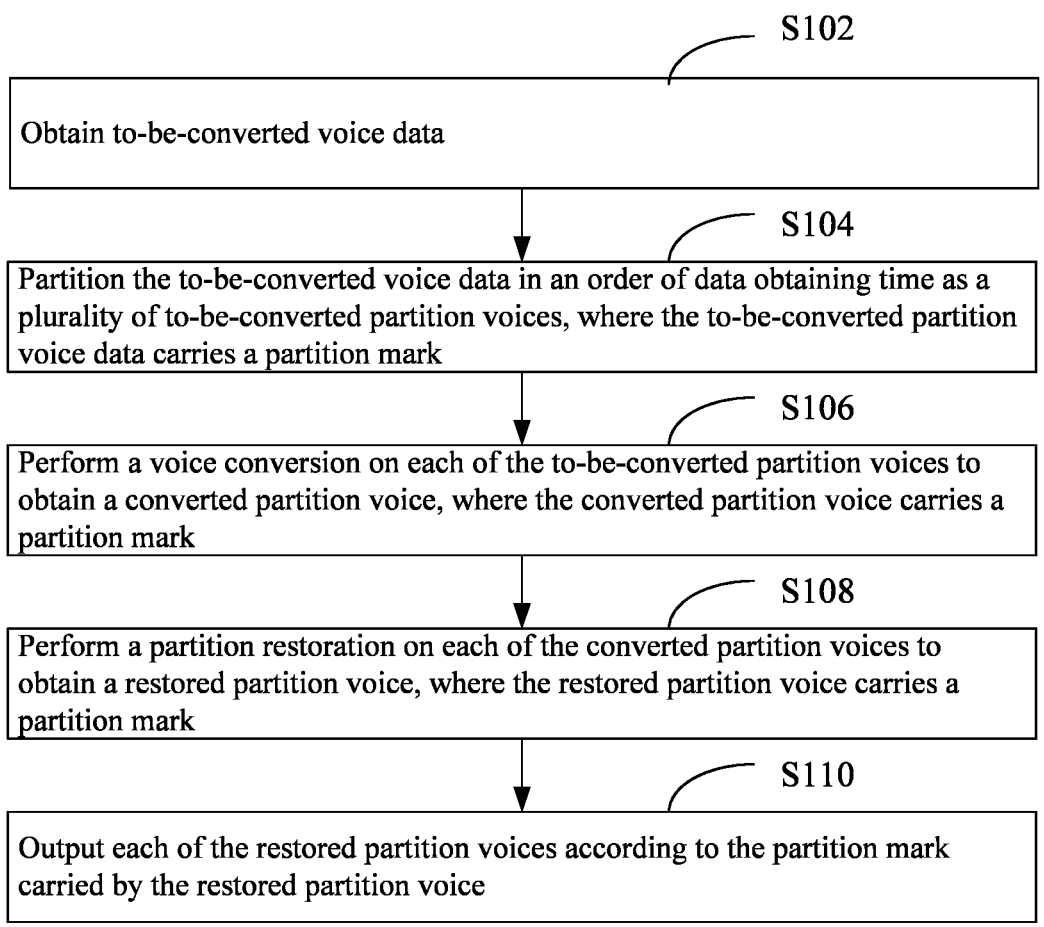
FIG. 1 is a flow chart of a streaming voice conversion method according to an embodiment of the present disclosure.
Figure 9:
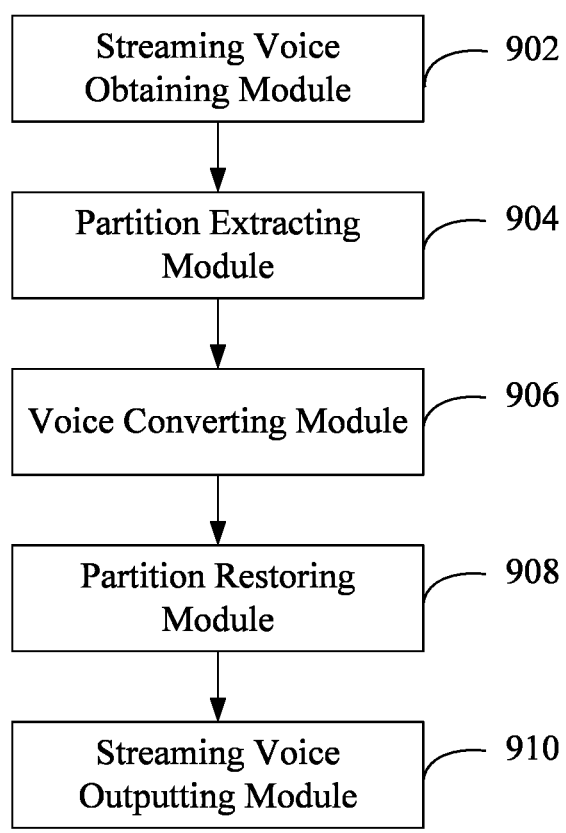
FIG. 9 is a schematic block diagram of a streaming voice conversion apparatus according to an embodiment of the present disclosure.
Figure 10:
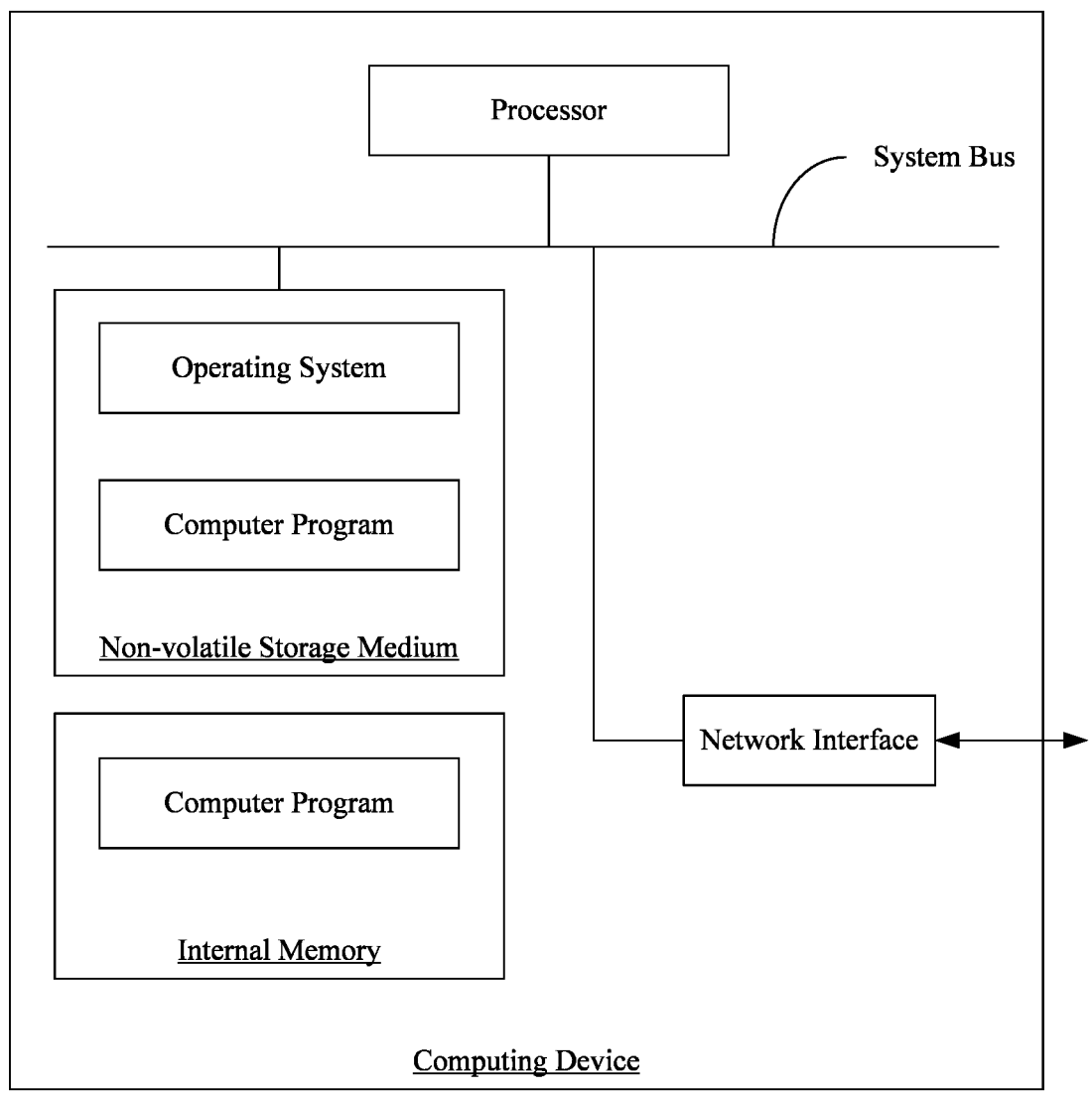
FIG. 10 is a schematic block diagram of a computing device according to an embodiment of the present disclosure.

FIG. 1 is a flow chart of a streaming voice conversion method according to an embodiment of the present disclosure. In this embodiment, a streaming voice conversion method is provided. The method is a computer-implemented method executable for a processor, which may be implemented through a streaming voice conversion apparatus as shown in FIG. 9 or implemented through a computing device as shown in FIG. 10. As shown in FIG. 1, the method includes the following steps.

S102: obtaining to-be-converted voice data.

In which, the to-be-converted voice data can be formed by splicing a plurality of short voice data, or be long recording data obtained at one time.

In which, the short voice data can be obtained by inputting voice data of a preset duration that is recorded in real time by a recording device (e.g., a recorder) in streaming manner at a preset time interval, or by inputting voice data of a preset duration in sequence from long recording data stored in a database in streaming manner at a preset time interval.

The to-be-converted voice data can be formed by splicing the plurality of obtained short voice data through steps including:

obtaining a plurality of short voice data of a preset duration in a streaming manner with a preset time interval; and splicing the plurality of obtained short voice data as the to-be-converted voice data.

The formats of the short voice data, the long recording data, and the to-be-converted voice data can be, for example WAV and MP3.

The input in streaming manner refers to that data is input in streaming manner which does not read/write data of the entire node or file, but only stores a small part of the data in a memory and processes this part of the data first, so that the data can be inputted while processing the inputted data.

S104: partitioning the to-be-converted voice data in an order of data obtaining time as a plurality of to-be-converted partition voices, where the to-be-converted partition voice data carries a partition mark.

In which, a preset unique partition duration and a preset common duration are obtained, and the to-be-converted voice data is partitioned according to the preset unique partition duration and the preset common duration as the plurality of to-be-converted partition voice, where each to-be-converted partition voice includes a unique partition voice and a common voice. The to-be-converted voice data is partitioned in the order of the time that the data in the to-be-converted voice data is obtained. It can be understandable that, in another embodiment, partition extraction can be performed on the to-be-converted voice data in a sequential manner according to the preset unique partition duration to obtain the plurality of to-be-converted partition voices, where the partition voice only includes the unique partition voice.

In which, a start time of the unique partition voice can be used as the partition mark of the to-be-converted partition voice, or the to-be-converted partition voice can be numbered in the order of generation (by partitioning the to-be-converted voice) and the number is used as the partition mark of the to-be-converted partition voice.

The start time of the unique partition voice refers to the time stamp of the voice data corresponding to the start time of the unique partition voice, which can be use as the partition mark of the to-be-converted partition voice.

The partitioning refers to segmenting large-scale data into a plurality of partitions. The plurality of partitions can be distributed to a plurality of computing units for computing so as to improve the processing throughput of the entire computing system.

The preset unique partition duration is the preset duration of the voice data that each to-be-converted partition voice has individually, and the user can set the preset unique partition duration according to actual needs. For example, the preset unique partition duration can be 0 ms, 100 ms, 200 ms, 300 ms, 400 ms, 500 ms, 600 ms, 800 ms, or 1000 ms.

The preset common duration is the preset duration of the overlapped voice between two adjacent to-be-converted partition voices. The user can set the preset common duration according to actual needs, for example, the value of the preset unique partition duration include 0 ms, 50 ms, 100 ms, 150 ms, 200 ms, 250 ms, 300 ms, 350 ms, 400 ms, 450 ms, 500 ms, 600 ms, or 700 ms.

When common voices are provided, the end of the former of two adjacent to-be-converted partition voices has a tail common voice of the preset common duration, and a head-end of the latter of two adjacent to-be-converted partition voices has the head common voice of the preset common duration, the tail common voice of the former of the two adjacent to-be-converted partition voices and the head common voice of the latter of the two adjacent to-be-converted partition voices have the same duration and content.

The time stamp of the voice data can be obtained by using the time of recording as the time stamp of the voice data or using the duration of the recorded voice data as the time stamp upon obtaining the voice data recorded in real time, or by using the duration of the short voice data in the long recording data as the time stamp of the voice data upon obtaining the voice data from the long recording data in the database.

In one embodiment, the preset common duration includes one value; in another embodiment, the preset common duration can include at least two different values, and it only needs to ensure that the tail common voice of the former of the two adjacent to-be-converted partition voices and the head common voice of the latter of the two adjacent to-be-converted partition voices have the same duration and content.

S106: performing a voice conversion on each of the to-be-converted partition voices to obtain a converted partition voice, where the converted partition voice carries a partition mark.

In this embodiment, the to-be-converted partition voice is input into a voice conversion model to perform voice conversion so as to obtain the converted partition voice, and the partition mark carried by the to-be-converted partition voice before voice conversion is used as the partition mark of the corresponding converted partition voice after voice conversion.

The voice conversion model can be, for example, the existing conversion model that can convert the voice of one creature into the voice of another creature, or the existing conversion model that can convert the voice into text.

The voice conversion refers to mapping each acoustic feature parameter of a source voice to each acoustic feature parameter of a target voice while the expressed content does not change after the voice conversion.

S108: performing a partition restoration on each of the converted partition voices to obtain a restored partition voice, where the restored partition voice carries a partition mark.

When the to-be-converted partition voice includes the unique partition voice and the common voice, the plurality of converted partition voices are spliced as a converted partition voice stream according to the partition mark carried by the converted partition voices; two adjacent converted partition voices are obtained from the converted partition voice stream; a weighted summation is performed on the converted tail common voice of the former of the two adjacent converted partition voices and the converted head common voice of the latter of the two adjacent converted partition voices to obtain a superimposed common voice; the superimposed common voice and the converted unique partition voice are spliced to obtain the plurality of restored partition voices, and the partition mark carried by the converted partition voice before the partition restoration is used as the partition mark of the corresponding restored partition voice after the partition restoration. The superimposed common voice is obtained through weighted summation, and then the restored partition voice is obtained by splicing the superimposed common voice and the converted unique partition voice, so that the connection between the two adjacent restored partition voices can be smooth so as to avoid noises during playback, thereby achieving a high-fidelity effect of the converted voice with respect to the voice before conversion.

When the to-be-converted partition voice only includes the unique partition voice, the converted partition voice is directly used as the restored partition voice.

S110: outputting each of the restored partition voices according to the partition mark carried by the restored partition voice.

In which, the restored partition voice is played sequentially according to the sequence of the partition marks carried by the restored partition voices. In another embodiment, the restored partition voice can be stored according to the partition mark carried by the restored partition voice.

In this embodiment, the streaming voice conversion method partitions the to-be-converted voice data in the order of data obtaining time as the plurality of to-be-converted partition voices, performs the voice conversion on each of the to-be-converted partition voices to obtain the converted partition voice, then performs the partition restoration on each of the converted partition voices to obtain the restored partition voice, and finally outputs each of the restored partition voices according to the partition mark carried by the restored partition voice. Regardless of the duration of the input voice, the processing mechanism of the partition extraction, partition conversion, and partition restoration is conducive to making full use of the processor's multi-core parallel capability to process multiple partitions of data at the same time, which can solve the problem of processing large-capacity voice data that occupies too much cache. The response time is shortened, and the conversion speed is improved. The to-be-converted voice data is obtained in streaming manner, and each of the restored partition voices is output according to the partition mark carried by the restored partition voice, which ensures the high-fidelity effect of the output voice in hearing regardless of the duration of the input voice.

In one embodiment, the to-be-converted voice data is obtained in streaming manner and cached. In partition extraction, the extracted to-be-converted voice data is deleted from the cache. After voice conversion and partition restoration, the restored partition voice is output in streaming manner, and the restored partition voice that has been output is deleted from the cache. The above-mentioned streaming mechanism makes full use of the available I/O resources when the chip input/output the voice, and enables every link of the streaming voice conversion method to operate at the same time, which can solve the problem of a single link occupying too large cache when processing large audio data, shortens the response time of the streaming voice conversion method, increases the conversion speed, and ultimately improves the performance of real-time voice recording, conversion, and output.

Figure 2:
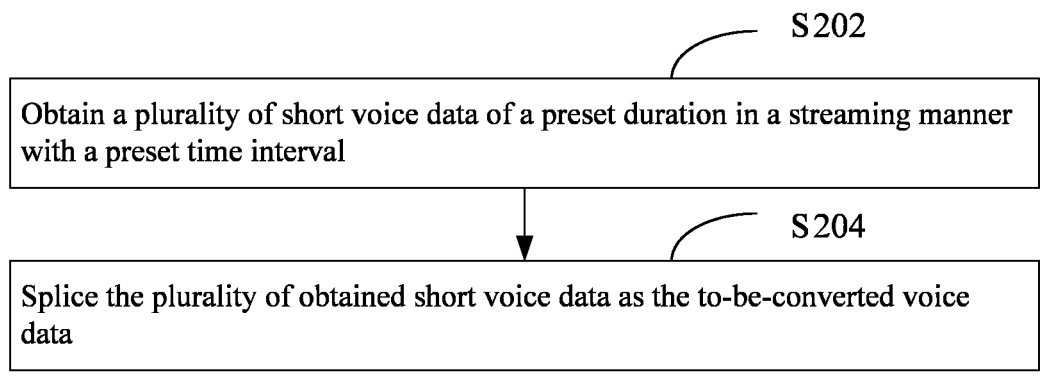
FIG. 2 is a flow chart of obtaining to-be-converted voice data in the streaming voice conversion method according to the embodiment of FIG. 1.

FIG. 2 is a flow chart of obtaining to-be-converted voice data in the streaming voice conversion method according to the embodiment of FIG. 1. As shown in FIG. 2, in one embodiment, the step S102 of obtaining the to-be-converted voice data includes the following steps.

S202: obtaining a plurality of short voice data of a preset duration in a streaming manner with a preset time interval.

In this embodiment, the short voice data of the preset duration is obtained at the preset time interval until all the voice data is received. For example, the preset time interval can be set to 50 ms, and the short voice data is obtained once every 50 ms until all of the voice data is received. It obtains at the preset time interval so that the trigger time is fixed and multiple triggers are realized. Fixed trigger time can reduce the resources of the processing device and/or processing system for obtaining voice data, and multiple triggers can avoid missing voice data.

In which, the obtaining order complies with the sequence of the timestamps of the voice data, where the ones with the earlier time stamp is obtained first, and the ones with the later timestamp is obtained later, which facilitates the real-time conversion of real-time voice.

S204. splicing the plurality of obtained short voice data as the to-be-converted voice data.

In this embodiment, the plurality of obtained short voice data is spliced as the to-be-converted voice data in the order of their obtaining time.

In another embodiment, the step S102 of obtaining the to-be-converted voice data further includes: obtaining a plurality of short voice data of a preset duration in a streaming manner with a preset time interval; converting the short voice data at a preset sampling rate; and splicing the plurality of converted short voice data as the to-be-converted voice data. For example, the sampling rate of 8 KHz, 44.1 KHz, 48 KHz, and 96 KHz can be changed to 16 KHZ. The change of the sampling rate is beneficial to the training of the voice conversion model used by the streaming voice conversion method, and is also beneficial to the method to be applicable to various sampling rates.

Figure 3:
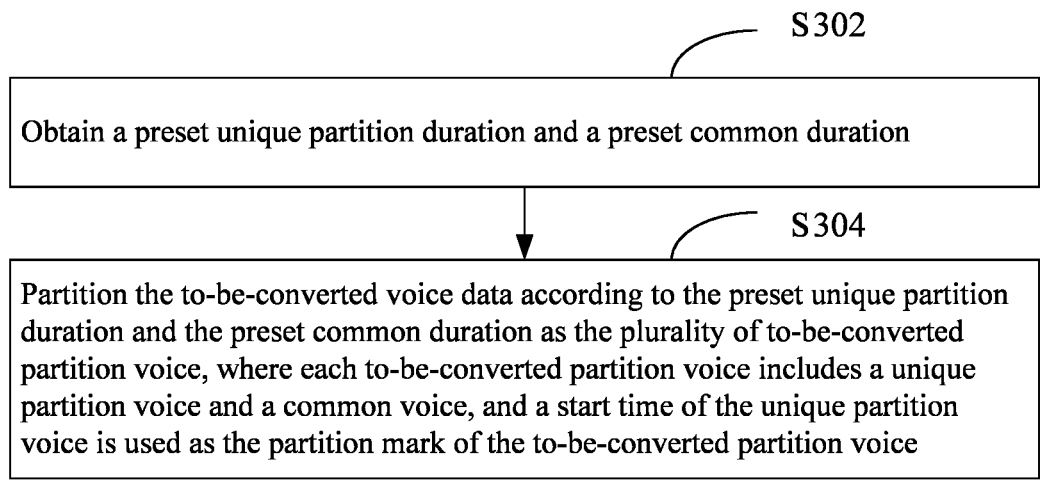
FIG. 3 is a flow chart of the partition extraction in the streaming voice conversion method according to the embodiment of FIG. 1.

FIG. 3 is a flow chart of the partition extraction in the streaming voice conversion method according to the embodiment of FIG. 1. As shown in FIG. 3, in one embodiment, the step S104 of partitioning the to-be-converted voice data in the order of data obtaining time as the plurality of to-be-converted partition voices include:

S302: obtaining a preset unique partition duration and a preset common duration; and S304: partitioning the to-be-converted voice data according to the preset unique partition duration and the preset common duration as the plurality of to-be-converted partition voice, where each to-be-converted partition voice includes a unique partition voice and a common voice, and a start time of the unique partition voice is used as the partition mark of the to-be-converted partition voice.

Figure 4:
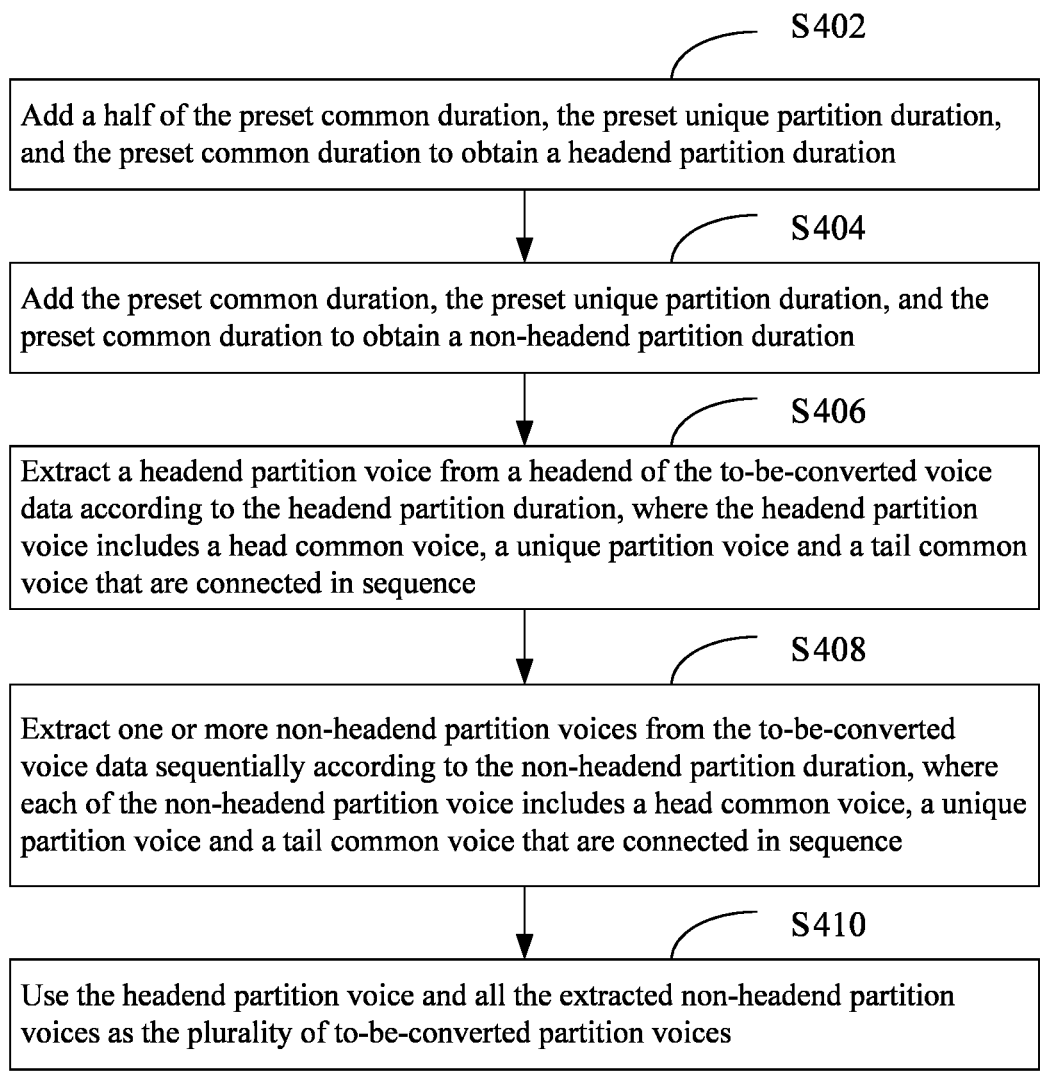
FIG. 4 is a flow chart of the partition processing in the streaming voice conversion method according to the embodiment of FIG. 3.

FIG. 4 is a flow chart of the partition processing in the streaming voice conversion method according to the embodiment of FIG. 3. As shown in FIG. 4, in one embodiment, the step 304 of partitioning the to-be-converted voice data according to the preset unique partition duration and the preset common duration as the plurality of to-be-converted partition voice includes the following steps.

S402: adding a half of the preset common duration, the preset unique partition duration, and the preset common duration to obtain a headend partition duration;

S404: adding the preset common duration, the preset unique partition duration, and the preset common duration to obtain a non-headend partition duration.

S406: extracting a headend partition voice from a headend of the to-be-converted voice data according to the headend partition duration, where the headend partition voice includes a head common voice, a unique partition voice and a tail common voice that are connected in sequence.

In this embodiment, the voice data of a half of the preset common duration is extracted from the headend of the to-be-converted voice data as the head common voice of the headend partition voice, then the end time of the head common voice of the headend partition voice is used as the start time for extracting the voice data of the preset unique partition duration from the to-be-converted voice data to use as the unique partition voice of the headend partition voice, and then the end time of the unique partition voice of the headend partition voice to use as the start time for extracting the voice data of the preset common duration from the to-be-converted voice data to use as the tail common voice of the headend partition voice, and finally the head common voice, the unique partition voice, and the tail common voice of the headend partition voice are spliced in sequence as the headend partition voice.

In which, the headend of the to-be-converted voice data can be, for example, the beginning of each partition of voice data which re-inputted after each pause, or be the beginning of the voice data which input for the first time after each powered on of the device or system executing the streaming voice conversion method. For example, a device or system that adopts the streaming voice conversion method obtains data for the first time whenever it is powered on, and uses the duration of the voice data as the timestamp to obtain the voice data in 0th-4th minutes, 5th-9th minutes, 10th-12th minutes, and 13th-15th minutes after each power on while the time in-between is taken as the time of pause. The to-be-converted voice data corresponding to 0th minute, 5th minutes, 10th minutes, and 13th minutes is used as the headend of the to-be-converted voice data after each pause, or the to-be-converted voice data corresponding to 0th minutes is used as the headend of the to-be-converted voice data after each powered on.

S408: extracting one or more non-headend partition voices from the to-be-converted voice data sequentially according to the non-headend partition duration, where each of the non-headend partition voice includes a head common voice, a unique partition voice and a tail common voice that are connected in sequence.

In this embodiment, the voice data of the preset common duration is extracted from the to-be-converted voice data with the end time of the unique voice partition of the former of two adjacent converted voice partitions as the start time to use as the head common voice of the non-headend partition voice, then the end time of the head common voice of this partition is used as the start time to extract the voice data of the preset unique partition duration from the to-be-converted voice data to use as the unique partition voice of the non-headend partition voice, and then the end time of the unique partition voice of this partition is used as the start time to extract the voice data of the preset common duration from the to-be-converted voice data to take as the tail common voice of the non-headend partition voice, and finally the head common voice, the unique partition voice, and the tail common voice of the non-headend partition voice are sequentially spliced as the non-headend partition voice.

S410: using the headend partition voice and all the extracted non-headend partition voices as the plurality of to-be-converted partition voices.

In an example, the preset common duration is set to 400 ms, and the preset unique partition duration is set to 600 ms. In the case that the to-be-converted partition voice is the headend partition voice, the duration is 1200 ms, where the duration of the head partition voice is 200 ms, the duration of the unique partition voice is 600 ms, and the duration of the tail common voice is 400 ms. In the case that the to-be-converted partition voice is the intermediate partition, the to-be-converted partition voice is the non-headend partition voice, and the duration is 1400 ms, where the duration of the head common voice is 400 ms, the duration of the unique partition voice is 600 ms, and the duration of the tail common voice is 400 ms. In the case that the to-be-converted partition voice is the last partition, the to-be-converted partition voice is the non-headend partition voice, and it only includes the head common voice of 400 ms when the duration is less than or equal to 400 ms; it includes the head common voice and unique partition voice of 400 ms sequentially when the duration of the non-headend partition voice is between 400 ms and 1000 ms (including 1000 ms); and it includes the head common voice of 400 ms and the unique partition voice and tail common voice of 600 ms when the duration of the non-headend partition voice is between 400 ms and 1000 ms.

In this embodiment, by providing the headend common voice of ½ of the preset common duration in the headend partition voice, the difference between the durations of the headend partition voice and the non-headend partition voice can be reduced, which improves the uniformity of the duration of the to-be-converted partition voice, and is beneficial to make full use of device or system resources, and improves the conversion efficiency of the streaming voice conversion method.

In another embodiment, the step 304 of partitioning the to-be-converted voice data according to the preset unique partition duration and the preset common duration as the plurality of to-be-converted partition voice further includes:

adding the preset unique partition duration and the preset common duration to obtain the headend partition duration;

adding the preset common duration, the preset unique partition duration, and the preset common duration to obtain the non-headend partition duration;

extracting from the headend of the to-be-converted voice data according to the headend partition duration to obtain the headend partition voice, where the headend partition voice includes the unique partition voice and the tail common voice that are connected in sequence;

extracting one or more non-headend partition voices from the to-be-converted voice data sequentially according to the non-headend partition duration, where each of the non-headend partition voice includes a head common voice, a unique partition voice and a tail common voice that are connected in sequence; and using the headend partition voice and all the extracted non-headend partition voices as the plurality of to-be-converted partition voices.

The step of extracting from the headend of the to-be-converted voice data according to the headend partition duration to obtain the headend partition voice includes: extracting the voice data of the preset unique partition duration from the headend of the to-be-converted voice data to take as the unique partition voice of the headend partition voice, and then using the end time of the unique partition voice of the headend partition voice as the start time to extract the voice data of the preset common duration from the to-be-converted voice data to take as the tail common voice of the headend partition voice, and splicing the unique partition voice and the tail common voice of the headend partition voice in sequence as the headend partition voice. In an example, the preset common duration is 400 ms, and the preset unique partition duration is 600 ms. In the case that the to-be-converted partition voice is the headend partition voice, the duration is 1000 ms, where the duration of the unique partition voice is 600 ms and the duration of the tail common voice is 400 ms.

Figure 5:
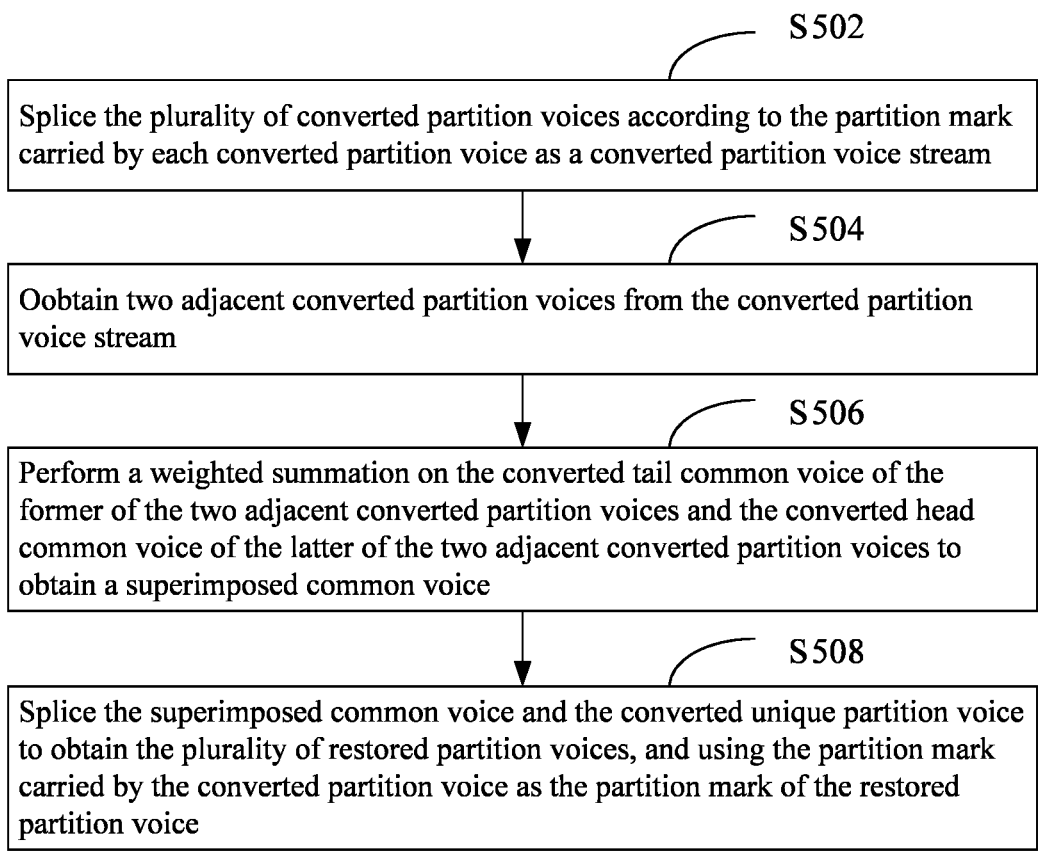
FIG. 5 is a flow chart of the partition restoration in the streaming voice conversion method according to the embodiment of FIG. 1.

FIG. 5 is a flow chart of the partition restoration in the streaming voice conversion method according to the embodiment of FIG. 1. As shown in FIG. 5, in one embodiment, the converted partition voice includes the converted header common voice, the converted unique partition voice, and the converted tail common voice.

In this embodiment, the head common voice is converted to the converted head common voice after voice conversion, and the unique partition voice is converted to the converted unique partition voice after voice conversion, and the tail common voice is converted to the converted tail common voice after voice conversion.

The step S108 of performing the partition restoration on each of the converted partition voices to obtain the restored partition voice includes the following steps.

S502: splicing the plurality of converted partition voices according to the partition mark carried by each converted partition voice as a converted partition voice stream.

In which, the plurality of converted partition voices is spliced according to the sequence of the partition marks carried by the converted partition voices as the converted partition voice stream.

S504: obtaining two adjacent converted partition voices from the converted partition voice stream.

In this embodiment, the two adjacent converted partition voices are obtained from the converted partition voice stream according to the sequence of the partition marks carried by the converted partition voices.

S506: performing a weighted summation on the converted tail common voice of the former of the two adjacent converted partition voices and the converted head common voice of the latter of the two adjacent converted partition voices to obtain a superimposed common voice.

In this embodiment, the weighted summation is performed on the voice data corresponds to the same time stamps of the converted tail common voice of the former of the two adjacent converted partition voices and the converted head common voice of the latter of the two adjacent converted partition voices to obtain the superimposed common voice.

It can be understood that, there is no need to perform the weighted summation on the converted head common voice of the converted partition voice when the converted partition voice is a headend partition and includes the converted head common voice, and there is no need to perform the weighted summation on the converted tail common voice of the converted partition voice when the converted partition voice is the last partition and includes the converted tail common voice.

S508: splicing the superimposed common voice and the converted unique partition voice to obtain the plurality of restored partition voices, and using the partition mark carried by the converted partition voice as the partition mark of the restored partition voice.

In this embodiment, the superimposed common voice is obtained through weighted summation, and then the restored partition voice is obtained by splicing the superimposed common voice and the converted unique partition voice, so that the connection between the two adjacent restored partition voices can be smooth so as to avoid noises during playback, thereby achieving a high-fidelity effect of the converted voice with respect to the voice before conversion.

In another embodiment, when the to-be-converted partition voice only includes the unique partition voice, the step S108 of performing the partition restoration on each of the converted partition voices to obtain the restored partition voice further includes: using the converted partition voice as the restored partition voice directly, and using the partition mark carried by the converted partition voice as the partition mark of the restored partition voice.

In one embodiment, the step S506 of performing the weighted summation on the converted tail common voice of the former of the two adjacent converted partition voices and the converted head common voice of the latter of the two adjacent converted partition voices to obtain the superimposed common voice includes:

performing the weighted summation according to the following formula to obtain the superimposed common voice D:

$$D = m_1 \times W + m_2 \times K;$$
$$m_2 = 1 - m_1; \text{ and}$$
$$m_1 = \frac{1}{1 + \exp(-x \times 0.015)}, x \in \left(-\frac{t}{2}, +\frac{t}{2}\right);$$

where, W is the converted tail common voice of the former of the two adjacent converted voice partitions, is the weight of the converted tail common voice of the former of the two adjacent converted voice partitions, K is the converted head common voice of the latter of the two adjacent converted voice partitions, $m_2$ is the weight of the converted head common voice of the latter of the two adjacent converted voice partitions, and t is the preset common duration, and expo is an exponential function in advanced mathematics.

Figure 6:
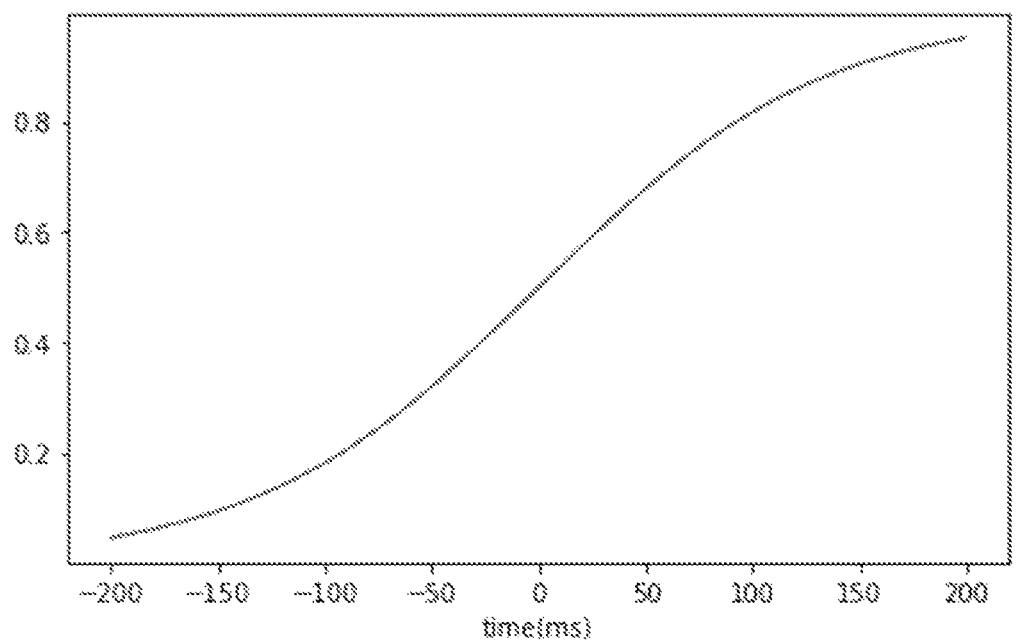
FIG. 6 is a curve diagram of the weight of the converted tail common voice of the former partition according to the embodiment of FIG. 1.
Figure 7:
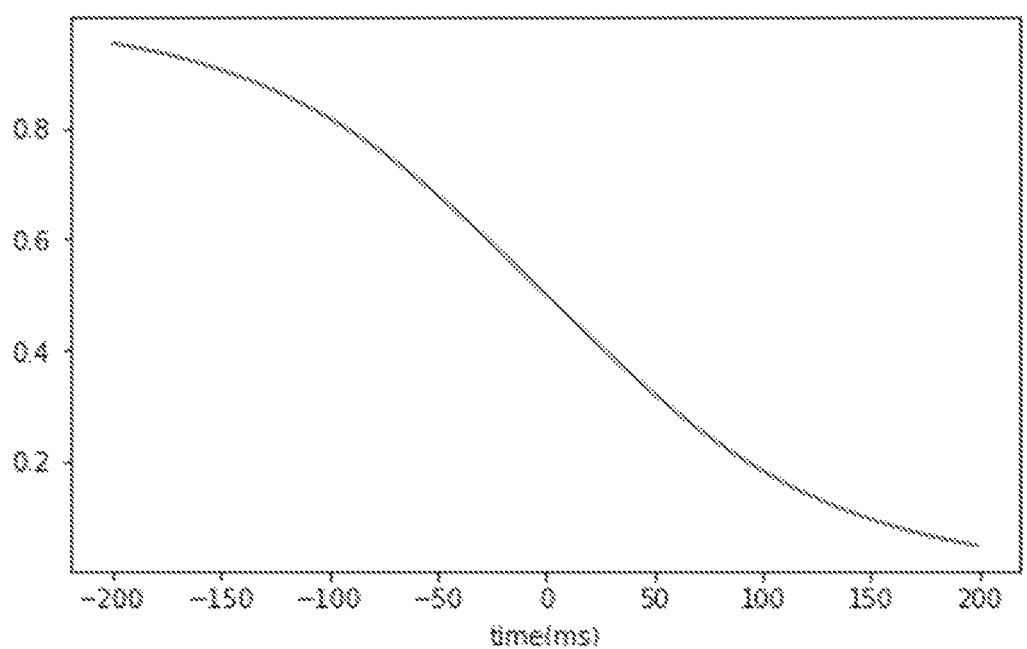
FIG. 7 is a curve diagram of the weight of the converted head common voice of the latter partition according to the embodiment of FIG. 1.

FIG. 6 is a curve diagram of the weight of the converted tail common voice of the former partition according to the embodiment of FIG. 1 (i.e., the curve diagram of $m_1$); and FIG. 7 is a curve diagram of the weight of the converted head common voice of the latter partition according to the embodiment of FIG. 1 (i.e., the curve diagram of $m_2$). As shown in the figures, the curve of $m_1$ is gradually increased while the curve of $m_2$ is gradually decreased, and the middle parts of the curve of $m_1$ and the curve of $m_2$ are equal, hence the superimposed common voice obtained by performing weighted summation on the $m_1$ and $m_2$ the increases the smoothness for the connection between the two adjacent restored partition voices, which further ensures the high-fidelity effect of the output voice in hearing while outputting each of the restored partition voices according to the partition mark carried by the restored partition voice.

In other embodiments, it can be understood that, other weighted summation algorithm can also be used.

In one embodiment, the step S508 of splicing the superimposed common voice and the converted unique partition voice to obtain the plurality of restored partition voices includes:

using the superimposed common voice as a head superimposed voice of the latter of the two adjacent converted partition voices; and splicing the head superimposed voice and the converted unique partition voice as the plurality of restored partition voices.

In this manner, the steps to be executed are reduced, and the execution efficiency of the streaming voice conversion method is improved.

In this embodiment, the superimposed common voice is obtained through weighted summation, so that the connection between the two adjacent restored partition voices can be smooth so as to avoid noises during playback, thereby achieving a high-fidelity effect of the converted voice with respect to the voice before conversion.

Figure 8:
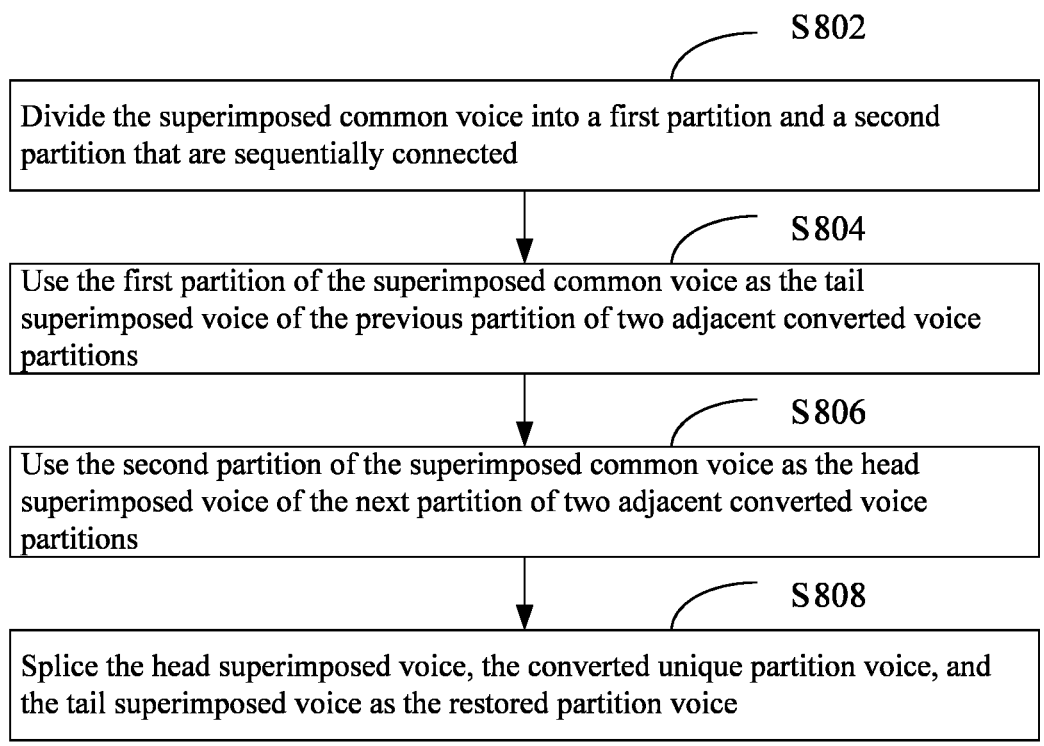
FIG. 8 is a flow chart of the splicing process in the streaming voice conversion method according to the embodiment of FIG. 1.

FIG. 8 is a flow chart of the splicing process in the streaming voice conversion method according to the embodiment of FIG. 1. As shown in FIG. 8, in this embodiment, the step of splicing the superimposed common voice and the converted unique partition voice to obtain the plurality of restored partition voices further includes the following steps.

S802: dividing the superimposed common voice into a first partition and a second partition that are sequentially connected.

In this embodiment, according to a preset partition ratio, the superimposed common voice is divided into a first partition and a second partition that are sequentially connected. For example, if the preset partition ratio is 1:1, the first partition is the first 50% of the superimposed common voice, and the second partition is the last 50% of the superimposed common voice; and if the preset partition ratio is 4:1, the first partition is the first 80% of the superimposed common voice, and the second partition is the last 20% of the superimposed common voice.

S804: using the first partition of the superimposed common voice as the tail superimposed voice of the former of two adjacent converted voice partitions.

S806: using the second partition of the superimposed common voice as the head superimposed voice of the latter of two adjacent converted voice partitions.

S808: splicing the head superimposed voice, the converted unique partition voice, and the tail superimposed voice as the restored partition voice.

In this embodiment, the superimposed common voice is obtained through weighted summation, and then the head superimposed voice and the tail superimposed voice are obtained according to the superimposed common voice, so that the connection between the two adjacent restored partition voices is further smoothed so as to avoid noises during playback, thereby achieving a high-fidelity effect of the converted voice with respect to the voice before conversion.

In an embodiment, the step of splicing the head superimposed voice and the converted unique partition voice as the plurality of restored partition voices includes:

splicing the converted head common voice and the converted unique partition voice corresponding to the converted partition voice in sequence as the plurality of restored partition voices, in response to the converted partition voice being a headend partition and including the converted head common voice;

splicing the head superimposed voice, the converted unique partition voice, and the converted tail common voice corresponding to the converted partition voice in sequence as the plurality of restored partition voices, in response to the converted partition voice being a last partition; and splicing the head superimposed voice and the converted unique partition voice corresponding to the converted partition voice in sequence as the plurality of restored partition voices, in response to the converted partition voice being an intermediate partition.

In an example, the preset common duration is set to 400 ms, and the preset unique partition duration is set to 600 ms. In the case that the to-be-converted partition voice is the headend partition voice, the duration is 1200 ms, where the duration of the head partition voice is 200 ms, the duration of the unique partition voice is 600 ms, and the duration of the tail common voice is 400 ms. In the case that the to-be-converted partition voice is the intermediate partition, the to-be-converted partition voice is the non-headend partition voice, and the duration is 1400 ms, where the duration of the head common voice is 400 ms, the duration of the unique partition voice is 600 ms, and the duration of the tail common voice is 400 ms. In the case that the to-be-converted partition voice is the last partition, the to-be-converted partition voice is the non-headend partition voice, and it only includes the head common voice of 400 ms when the duration is less than or equal to 400 ms; it includes the head common voice and unique partition voice of 400 ms sequentially when the duration of the non-headend partition voice is between 400 ms and 1000 ms (including 1000 ms); and it includes the head common voice of 400 ms and the unique partition voice and tail common voice of 600 ms when the duration of the non-headend partition voice is between 400 ms and 1000 ms. Since the duration does not change during voice conversion, the restored partition voice obtained by splicing is 800 ms (including the converted head common voice of 200 ms and the converted unique partition voice of 600 ms) when the converted partition voice is the headend partition and includes the converted head common voice, the restored partition voice obtained by splicing has the same duration as the converted partition voice of the last partition when the converted partition voice is the last partition, and the restored partition voice obtained by splicing is 1000 ms (including the head superimposed voice of 400 ms, and the converted unique partition voice of 600 ms) when the converted partition voice is the intermediate partition.

In one embodiment, the step of splicing the head superimposed voice, the converted unique partition voice, and the tail superimposed voice as the restored partition voice includes:

in the case that the converted partition voice is a headend partition and includes the converted head common voice, the converted head common voice, the unique partition voice, and the tail superimposed voice corresponding to the converted partition voice are sequentially spliced as the restored partition voice;

in the case that the converted partition voice is a headend partition and does not include the converted head common voice, the converted unique partition voice and the tail superimposed voices corresponding to the converted partition voice are spliced sequentially as the restored partition voice;

in the case that the converted partition voice is the last partition, the head superimposed voice, the converted unique partition voice, and the converted tail common voice corresponding to the converted partition voice are spliced in sequence as the restored partition voice; and in the case that the converted partition voice is the intermediate partition, the head superimposed voice, the converted unique partition voice, and the converted tail common voice corresponding to the converted partition voice are sequentially spliced as the restored partition voice.

In one embodiment, the step of performing the voice conversion on each of the to-be-converted partition voices to obtain the converted partition voice includes: performing, through a multi-core processor, the voice conversion on each of the to-be-converted partition voices in parallel manner to obtain the converted partition voice; and the step of performing the partition restoration on each of the converted partition voices to obtain the restored partition voice includes: performing, through the multi-core processor, the partition restoration on each of the converted partition voices in parallel manner to obtain the restored partition voice. In this embodiment, the voice conversion is performed on the plurality of the to-be-converted partition voices simultaneously based on the parallel processing capability of the multiple cores of the processor so as to make full use of the parallel processing of the processor; and the partition restoration is performed on the plurality of the converted partition voices simultaneously based on the parallel processing capability of the multiple cores of the processor so as to make full use of the parallel processing of the processor. In this manner, it solves the problem of processing large-capacity voice data that occupies too much cache. The response time is shortened, and the conversion speed is improved.

FIG. 9 is a schematic block diagram of a streaming voice conversion apparatus according to an embodiment of the present disclosure. As shown in FIG. 9, in one embodiment, a streaming voice conversion apparatus is also provided, which includes:

a streaming voice obtaining module 902 configured to obtain to-be-converted voice data;

a partition extracting module 904 configured to partition the to-be-converted voice data in an order of data obtaining time as a plurality of to-be-converted partition voices, where the to-be-converted partition voice data carries a partition mark;

a voice converting module 906 configured to perform a voice conversion on each of the to-be-converted partition voices to obtain a converted partition voice, where the converted partition voice carries a partition mark;

a partition restoring module 908 configured to perform a partition restoration on each of the converted partition voices to obtain a restored partition voice, where the restored partition voice carries a partition mark; and a streaming voice outputting module 910 configured to output each of the restored partition voices according to the partition mark carried by the restored partition voice.

In this embodiment, the streaming voice conversion apparatus includes a processor, a storage, and a recording device (e.g., a recorder of the streaming voice conversion apparatus of the streaming voice conversion apparatus itself) for obtaining the to-be-converted voice data which are connected through, for example, a system bus. In which, the processor is a multi-core processor, and the storage (e.g., a memory) store a computer program including the above-mentioned modules which enables the processor to implement the streaming voice conversion method when executed by the processor. The streaming voice conversion apparatus partitions the to-be-converted voice data in the order of data obtaining time as the plurality of to-be-converted partition voices, performs the voice conversion on each of the to-be-converted partition voices to obtain the converted partition voice, then performs the partition restoration on each of the converted partition voices to obtain the restored partition voice, and finally outputs each of the restored partition voices according to the partition mark carried by the restored partition voice. Regardless of the duration of the input voice, the processing mechanism of the partition extraction, partition conversion, and partition restoration is conducive to making full use of the processor's multi-core parallel capability to process multiple partitions of data at the same time, which can solve the problem of processing large-capacity voice data that occupies too much cache. The response time is shortened, and the conversion speed is improved. The to-be-converted voice data is obtained in streaming manner, and each of the restored partition voices is output according to the partition mark carried by the restored partition voice, which ensures the high-fidelity effect of the output voice in hearing regardless of the duration of the input voice.

FIG. 10 is a schematic block diagram of a computing device according to an embodiment of the present disclosure. The computer can be a terminal device or a server. As shown in FIG. 10, the computing device includes a processor, a storage, and a network interface which are connected through a system bus. In which, the processor is a multi-core processor, and the storage includes a non-volatile (or non-transitory) storage medium and an internal memory. The non-volatile storage medium of the computing device stores an operating system, and may also store a computer program which enables the processor to implement the streaming voice conversion method when executed by the processor. The internal memory may also store a computer program which enables the processor to perform the streaming voice conversion method when executed by the processor. The network interface is used to communicate with the exterior. It can be understood by those skilled in the art that, the structure shown in FIG. 10 is only a block diagram of a part of the structure related to the scheme of the present disclosure, and does not constitute a limitation of the computing device to which the scheme of the present disclosure is applied. The specific computing device may include more or fewer components than shown in the figures, or some components can be combined, or can have different component arrangements.

In one embodiment, the streaming voice conversion method for computing device sensors provided by the present disclosure can be implemented in the form of a computer program that can be executed on a computing device as shown in FIG. 10. The program templates for composing the streaming voice conversion apparatus for computing device sensors such as the streaming voice obtaining module 902, the partition extracting module 904, the voice converting module 906, the partition restoring module 908, and the streaming voice outputting module 910 can be stored in the storage of the computing device.

In one embodiment, the present disclosure further provides a non-transitory computer readable storage medium that stores a computer instruction program, and when the computer instruction program is executed by a processor, the processor executes the following steps:

obtaining to-be-converted voice data;

partitioning the to-be-converted voice data in an order of data obtaining time as a plurality of to-be-converted partition voices, where the to-be-converted partition voice data carries a partition mark;

performing a voice conversion on each of the to-be-converted partition voices to obtain a converted partition voice, where the converted partition voice carries a partition mark;

performing a partition restoration on each of the converted partition voices to obtain a restored partition voice, where the restored partition voice carries a partition mark; and outputting each of the restored partition voices according to the partition mark carried by the restored partition voice.

In this embodiment, the method implemented by executing through the processor partitions the to-be-converted voice data in the order of data obtaining time as the plurality of to-be-converted partition voices, performs the voice conversion on each of the to-be-converted partition voices to obtain the converted partition voice, then performs the partition restoration on each of the converted partition voices to obtain the restored partition voice, and finally outputs each of the restored partition voices according to the partition mark carried by the restored partition voice. Regardless of the duration of the input voice, the processing mechanism of the partition extraction, partition conversion, and partition restoration is conducive to making full use of the processor's multi-core parallel capability to process multiple partitions of data at the same time, which can solve the problem of processing large-capacity voice data that occupies too much cache. The response time is shortened, and the conversion speed is improved. The to-be-converted voice data is obtained in streaming manner, and each of the restored partition voices is output according to the partition mark carried by the restored partition voice, which ensures the high-fidelity effect of the output voice in hearing regardless of the duration of the input voice.

In one embodiment, a computing device is further provided, which includes at least one memory and at least one processor. The memory stores a computer instruction program. When the computer instruction program is executed by the processor, the processor executes the following steps:

obtaining to-be-converted voice data;

partitioning the to-be-converted voice data in an order of data obtaining time as a plurality of to-be-converted partition voices, where the to-be-converted partition voice data carries a partition mark;

performing a voice conversion on each of the to-be-converted partition voices to obtain a converted partition voice, where the converted partition voice carries a partition mark;

performing a partition restoration on each of the converted partition voices to obtain a restored partition voice, where the restored partition voice carries a partition mark; and outputting each of the restored partition voices according to the partition mark carried by the restored partition voice.

In this embodiment, the method implemented by executing through the processor partitions the to-be-converted voice data in the order of data obtaining time as the plurality of to-be-converted partition voices, performs the voice conversion on each of the to-be-converted partition voices to obtain the converted partition voice, then performs the partition restoration on each of the converted partition voices to obtain the restored partition voice, and finally outputs each of the restored partition voices according to the partition mark carried by the restored partition voice. Regardless of the duration of the input voice, the processing mechanism of the partition extraction, partition conversion, and partition restoration is conducive to making full use of the processor's multi-core parallel capability to process multiple partitions of data at the same time, which can solve the problem of processing large-capacity voice data that occupies too much cache. The response time is shortened, and the conversion speed is improved. The to-be-converted voice data is obtained in streaming manner, and each of the restored partition voices is output according to the partition mark carried by the restored partition voice, which ensures the high-fidelity effect of the output voice in hearing regardless of the duration of the input voice.

It should be noted that, the above-mentioned streaming voice conversion method, streaming voice conversion apparatus, storage medium, and computing device belong to a general inventive concept, and the content in the embodiments of the above-mentioned streaming voice conversion method, streaming voice conversion apparatus, storage medium, and computing device may be mutually applicable.

A person of ordinary skill in the art can understand that all or part of the processes in the above-mentioned embodiment methods can be implemented by instructing relevant hardware through a computer program. The program can be stored in a non-volatile computer readable storage medium. Here, when the program is executed, it may include the procedures of the above-mentioned method embodiments. Where, any reference to memory, storage, database or other media used in the embodiments provided in this application may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SL-DRAM), memory bus (Rambus) direct RAM (RDRAM), direct memory bus dynamic RAM (DRDRAM), and memory bus dynamic RAM (RDRAM), etc.

The technical features of the above embodiments can be combined arbitrarily. In order to make the description concise, all possible combinations of the technical features in the above embodiments are not described. However, as long as there is no contradiction in the combination of these technical features, they should It is considered as the range described in this specification.

The above-mentioned embodiments only express several implementation manners of the present disclosure, and their descriptions are relatively specific and detailed, but they should not be understood as a limitation on the patent scope of the present disclosure. It should be pointed out that for those of ordinary skill in the art, without departing from the concept of this application, several modifications and improvements can be made, and these all fall within the protection scope of this application. Therefore, the scope of protection of the patent of this application shall be subject to the appended claims.

What is claimed is:

1. A computer-implemented streaming voice conversion method, comprising steps of:

obtaining to-be-converted voice data;

partitioning the to-be-converted voice data in an order of data obtaining time as a plurality of to-be-converted partition voices, wherein the to-be-converted partition voice data carries a partition mark;

performing a voice conversion on each of the to-be-converted partition voices to obtain a converted partition voice, wherein the converted partition voice carries a partition mark;

performing a partition restoration on each of the converted partition voices to obtain a restored partition voice, wherein the restored partition voice carries a partition mark; and outputting each of the restored partition voices according to the partition mark carried by the restored partition voice;

wherein the step of partitioning the to-be-converted voice data in the order of data obtaining time as the plurality of to-be-converted partition voices comprises:

obtaining a preset unique partition duration and a preset common duration; and partitioning the to-be-converted voice data according to the preset unique partition duration and the preset common duration as the plurality of to-be-converted partition voice, wherein each to-be-converted partition voice comprises a unique partition voice and a common voice, and a start time of the unique partition voice is used as the partition mark of the to-be-converted partition voice.

2. The method of claim 1, wherein the step of obtaining the to-be-converted voice data comprises:

obtaining a plurality of short voice data of a preset duration in a streaming, manner with a preset time interval; and splicing the plurality of obtained short voice data as the to-be-converted voice data.

3. The method of claim 1, wherein the step of partitioning the to-be-converted voice data according to the preset unique partition duration and the preset common duration as the plurality of to-be-converted partition voice comprises:

adding a half of the preset common duration, the preset unique partition duration, and the preset common duration to obtain a headend partition duration;

adding the preset common duration, the preset unique partition duration, and the preset common duration to obtain a non-headend partition duration;

extracting a headend partition voice from a headend of the to-be-converted voice data according to the headend partition duration, wherein the headend partition voice comprises a head common voice, a unique partition voice and a tail common voice connected in sequence;

extracting one or more non-headend partition voices from the to-be-converted voice data sequentially according to the non-headend partition duration, wherein each of the non-headend partition voice comprises a head common voice, a unique partition voice and a tail common voice connected in sequence; and using the headend partition voice and all the extracted non-headend partition voices as the plurality of to-be-converted partition voices.

4. The method of claim 3, wherein the converted partition voice comprises a converted head common voice, a converted unique partition voice, and a converted tail common voice, and the step of performing the partition restoration on each of the converted partition voices to obtain the restored partition voice comprises:

splicing the plurality of converted partition voices according to the partition mark carried by each converted partition voice as a converted partition voice stream;

obtaining two adjacent converted partition voices from the converted partition voice stream;

performing a weighted summation on the converted tail common voice of the former of the two adjacent converted partition voices and the converted head common voice of the latter of the two adjacent converted partition voices to obtain a superimposed common voice; and splicing the superimposed common voice and the converted unique partition voice to obtain the plurality of restored partition voices, and using the partition mark carried by the converted partition voice as the partition mark of the restored partition voice.

5. The method of claim 4, wherein the step of splicing the superimposed common voice and the converted unique partition voice to obtain the plurality of restored partition voices comprises:

using the superimposed common voice as a head superimposed voice of the latter of the two adjacent converted partition voices; and splicing the head superimposed voice and the converted unique partition voice as the plurality of restored partition voices.

6. The method of claim 5, wherein the step of splicing the head superimposed voice and the converted unique partition voice as the plurality of restored partition voices comprises:

splicing the converted head common voice and the converted unique partition voice corresponding to the converted partition voice in sequence as the plurality of restored partition voices, in response to the converted partition voice being a headend partition and comprising the converted head common voice;

splicing the head superimposed voice, the converted unique partition voice, and the converted tail common voice corresponding to the converted partition voice in sequence as the plurality of restored partition voices, in response to the converted partition voice being a last partition; and splicing the head superimposed voice and the converted unique partition voice corresponding to the converted partition voice in sequence as the plurality of restored partition voices, in response to the converted partition voice being an intermediate partition.

7. The method of claim 1, wherein the step of performing the voice conversion on each of the to-be-converted partition voices to obtain the converted partition voice comprises:

performing, through a multi-core processor, the voice conversion on each of the to-be-converted partition voices in parallel manner to obtain the converted partition voice;

the step of performing the partition restoration on each of the converted partition voices to obtain the restored partition voice comprises:

performing, through the multi-core processor, the partition restoration on each of the converted partition voices in parallel manner to obtain the restored partition voice.

8. A streaming voice conversion apparatus, comprising:
a memory;
a processor; and
one or more computer programs stored in the memory and executable on the processor, wherein the one or more computer programs comprise:
instructions for obtaining to-be-converted voice data;
instructions for a partition extracting module configured to partitioning the to-be-converted voice data in an order of data obtaining time as a plurality of to-be-converted partition voices, wherein the to-be-converted partition voice data carries a partition mark;
instructions for performing a voice conversion on each of the to-be-converted partition voices to obtain a converted partition voice, wherein the converted partition voice carries a partition mark;
instructions for performing a partition restoration on each of the converted partition voices to obtain a restored partition voice, wherein the restored partition voice carries a partition mark; and
instructions for outputting each of the restored partition voices according to the partition mark carried by the restored partition voice;
wherein the instructions for partitioning the to-be-converted voice data in the order of data obtaining time as the plurality of to-be-converted partition voices comprise:
instructions for obtaining a preset unique partition duration and a preset common duration; and
instructions for partitioning the to-be-converted voice data according to the preset unique partition duration and the preset common duration as the plurality of to-be-converted partition voice, wherein each to-be-converted partition voice comprises a unique partition voice and a common voice and a start time of the unique partition voice is used as the partition mark of the to-be-converted partition voice.

9. The apparatus of claim 8, wherein the instructions for obtaining the to-be-converted voice data comprise:
instructions for obtaining a plurality of short voice data of a preset duration in a streaming manner with a preset time interval; and
instructions for splicing the plurality of obtained short voice data as the to-be-converted voice data.

10. The apparatus of claim 8, wherein the instructions for partitioning the to-be-converted voice data according to the preset unique partition duration and the preset common duration as the plurality of to-be-converted partition voice comprise:
instructions for adding a half of the preset common duration, the preset unique partition duration, and the preset common duration to obtain a headend partition duration;

instructions for adding the preset common duration, the preset unique partition duration, and the preset common duration to obtain a non-headend partition duration;
instructions for extracting a headend partition voice from a headend of the to-be-converted voice data according to the headend partition duration, wherein the headend partition voice comprises a head common voice, a unique partition voice and a tail common voice connected in sequence;
instructions for extracting one or more non-headend partition voices from the to-be-converted voice data sequentially according to the non-headend partition duration, wherein each of the non-headend partition voice comprises a head, common voice, a unique partition voice and a tail common voice connected in sequence; and
instructions for using the headend partition voice and all the extracted non-headend partition voices as the plurality of to-be-converted partition voices.

11. The apparatus of claim 10, wherein the converted partition voice comprises a converted head common voice, a converted unique partition voice, and a converted tail common voice, and the instructions for performing the partition restoration on each of the converted partition voices to obtain the restored partition voice comprise:
instructions for splicing the plurality of converted partition voices according to the partition mark carried by each converted partition voice as a converted partition voice stream;
instructions for obtaining two adjacent converted partition voices from the converted partition voice stream;
instructions for performing a weighted summation on the converted tail common voice of the former of the two adjacent converted partition voices and the converted head common voice of the latter of the two adjacent converted partition voices to obtain a superimposed common voice; and
instructions for splicing the superimposed common voice and the converted unique partition voice to obtain the plurality of restored partition voices, and using the partition mark carried by the converted partition voice as the partition mark of the restored partition voice.

12. The apparatus of claim 11, wherein the instructions for splicing the superimposed common voice and the converted unique partition voice to obtain the plurality of restored partition voices comprise:
instructions for using the superimposed common voice as a head superimposed voice of the latter of the two adjacent converted partition voices; and
instructions for splicing the head superimposed voice and the converted unique partition voice as the plurality of restored partition voices.

13. The apparatus of claim 12, wherein the instructions for splicing the head superimposed voice and the converted unique partition voice as the plurality of restored partition voices comprise:
instructions for splicing the converted head common voice and the converted unique partition voice corresponding to the converted partition voice in sequence as the plurality of restored partition voices, in response to the converted partition voice being a headend partition and comprising the converted head common voice;
instructions for splicing the head superimposed voice, the converted unique partition voice, and the converted tail common voice corresponding to the converted partition voice in sequence as the plurality of restored partition voices, in response to the converted partition voice being a last partition; and
instructions for splicing the head superimposed voice and the converted unique partition voice corresponding to the converted partition voice in sequence as the plurality of restored partition voices, in response to the converted partition voice being an intermediate partition.

14. The apparatus of claim 8, wherein the instructions for performing the voice conversion on each of the to-be-converted partition voices to obtain the converted partition voice comprise:
instructions for performing, through a multi-core processor, the voice conversion on each of the to-be-converted partition voices in parallel manner to obtain the converted partition voice;
the instructions for performing the partition restoration on each of the converted partition voices to obtain the restored partition voice comprise:
instructions for performing, through the multi-core processor, the partition restoration on each of the converted partition voices in parallel manner to obtain the restored partition voice.

15. A non-transitory computer readable storage medium for storing one or more computer programs, wherein the one or more computer programs comprise:
instructions for obtaining to-be-converted voice data;
instructions for partitioning the to-be-converted voice data in an order of data obtaining time as a plurality of to-be-converted partition voices, wherein the to-be-converted partition voice data carries a partition mark;
instructions for performing a voice conversion on each of the to-be-converted partition voices to obtain a converted partition voice, wherein the converted partition voice carries a partition mark;
instructions for performing a partition restoration on each of the converted partition voices to obtain a restored partition voice, wherein the restored partition voice carries a partition mark; and
instructions for outputting each of the restored partition voices according to the partition mark carried by the restored partition voice;
wherein the instructions for partitioning the to-be-converted voice data in the order of data obtaining time as the plurality of to-be-converted partition voices comprise:
instructions for obtaining a preset unique partition duration and a preset common duration; and
instructions for partitioning the to-be-converted voice data according to the preset unique partition duration and the preset common duration as the plurality of to-be-converted partition voice, wherein each to-be-converted partition voice comprises a unique partition voice and a common voice, and a start time of the unique partition voice is used as the partition mark of the to-be-converted partition voice.

16. The storage medium of claim 15, wherein the instructions for obtaining the to-be-converted voice data comprise:
instructions for obtaining a plurality of short voice data of a preset duration in a streaming manner with a preset time interval; and
instructions for splicing the plurality of obtained short voice data as the to-be-converted voice data.

17. The storage medium of claim 15, wherein the instructions for partitioning the to be-converted voice data according to the preset unique partition duration and the preset common duration as the plurality of to-be-converted partition voice comprise:

instructions for adding a half of the preset common duration, the preset unique partition duration, and the preset common duration to obtain a headend partition duration;

instructions for adding the preset common duration, the preset unique partition duration, and the preset common duration to obtain a non-headend partition duration;

instructions for extracting a headend partition voice from a headend of the to-be-converted voice data according to the headend partition duration, wherein the headend partition voice comprises a head common voice, a unique partition voice and a tail common voice connected in sequence;

instructions for extracting one or more non-headend partition voices from the to-be-converted voice data sequentially according to the non-headend partition duration, wherein each of the non-headend partition voice comprises a head common voice, a unique partition voice and a tail common voice connected in sequence; and instructions for using the headend partition voice and all the extracted non-headend partition voices as the plurality of to-be-converted partition voices.

18. The storage medium of claim 17, wherein the converted partition voice comprises a converted head common voice, a converted unique partition voice, and a converted tail common voice, and the instructions for performing the partition restoration on each of the converted partition voices to obtain the restored partition voice comprise:

instructions for splicing the plurality of converted partition voices according to the partition mark carried by each converted partition voice as a converted partition voice stream;

instructions for obtaining two adjacent converted partition voices from the converted partition voice stream;

instructions for performing a weighted summation on the converted tail common voice of the former of the two adjacent converted partition voices and the converted head common voice of the latter of the two adjacent converted partition voices to obtain a superimposed common voice; and instructions for splicing the superimposed common voice and the converted unique partition voice to obtain the plurality of restored partition voices, and using the partition mark carried by the converted partition voice as the partition mark of the restored partition voice.

19. The storage medium of claim 18, wherein the instructions for splicing the superimposed common voice and the converted unique partition voice to obtain the plurality of restored partition voices comprise:

instructions for using the superimposed common voice as a head superimposed voice of the latter of the two adjacent converted partition voices; and instructions for splicing the head superimposed voice and the converted unique partition voice as the plurality of restored partition voices.

20. The storage medium of claim 19, wherein the instructions for splicing the head superimposed voice and the converted unique partition voice as the plurality of restored partition voices comprise:

instructions for splicing the converted head common voice and the converted unique partition voice corresponding to the converted partition voice in sequence as the plurality of restored partition voices, in response to the converted partition voice being a headend partition and comprising the convened head common voice;

instructions for splicing the head superimposed voice, the converted unique partition voice, and the converted tail common voice corresponding to the convened partition voice in sequence as the plurality of restored partition voices, in response to the converted partition voice being a last partition; and instructions for splicing the head superimposed voice and the converted unique partition voice corresponding to the converted partition voice in sequence as the plurality of restored partition voices, in response to the converted partition voice being an intermediate partition.

\* \* \* \* \*